Oct. 2, 1923.

L. P. HALLADAY

BUMPER

Filed Dec. 1, 1922

1,469,591

Witness.
Edward T. Wray

Inventor.
Lewis P. Halladay
by Parker & Carter
Attorneys

Patented Oct. 2, 1923.

1,469,591

UNITED STATES PATENT OFFICE.

LEWIS P. HALLADAY, OF DECATUR, ILLINOIS.

BUMPER.

Application filed December 1, 1922. Serial No. 604,168.

*To all whom it may concern:*

Be it known that I, LEWIS P. HALLADAY, a citizen of the United States, residing at Decatur, in the county of Macon and State of Illinois, have invented a certain new and useful Improvement in Bumpers; of which the following is a specification.

This invention relates to improvements in automobile bumper bars of the type wherein the bumper is vertically widened throughout at least a portion of its length, and wherein a vertically extended impact surface is provided. One object of the invention is to provide a bumper of this type which has a large measure of strength from front to rear so that in the case of impact with an obstacle, it will not readily give way or be broken or bent. Other objects will appear from time to time through-out the specification and claims.

My invention is illustrated more or less diagrammatically in the accompanying drawings, wherein.

Like parts are designated by like characters throughout.

Figure 1:
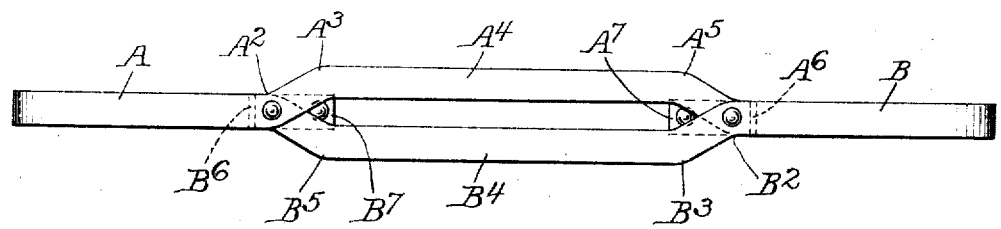
Figure 1 is a front elevation of the device.
Figure 2:
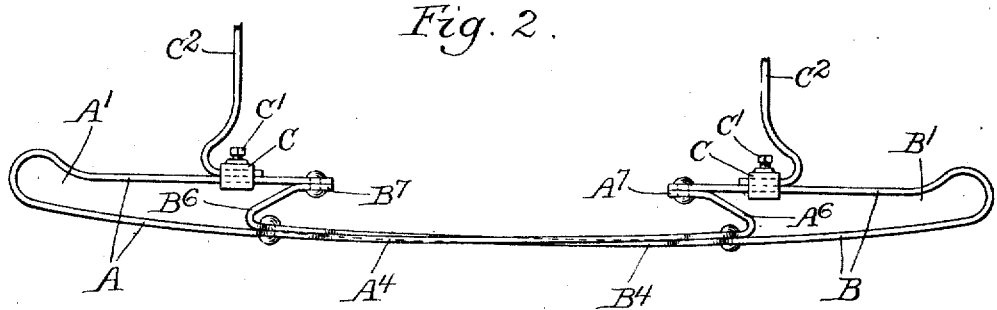
Figure 2 is a plan view of the device shown in Figure 1.

The bumper is formed of two members A and B. The member A is bent so as to form a loop $A^1$. It is upwardly bent at $A^2$, and laterally bent at $A^3$. It is provided with the laterally extended portion $A^4$, is downwardly bent at $A^5$, and rearwardly bent at $A^6$. It terminates at $A^7$ at which point it is rigidly secured to the end of the member B. This member B is bent to form a loop $B^1$. It is downwardly bent at $B^2$, laterally bent at $B^3$, is provided with the laterally extended portion $B^4$, is upwardly bent at $B^5$, and rearwardly bent at $B^6$, terminating at $B^7$ at which point it is rigidly secured to the end of the member A.

Thus by means of the two identically shaped members, a bumper is provided with two narrowed, laterally extending end portions, and a vertically enlarged central contact portion is formed. This bumper is reinforced horizontally by the rearward bending of the members A and B. Each of these rearwardly bent portions, lying as it does in the rear of one end of the widened contact portion, serves to strengthen the bumper at the point where the destructive effect of a blow is likely to be most severe.

C, C are engaging members which are adjustably held in position on the members A and B by means of set screws $C^1$ $C^1$, and also engage the bumper supporting bars $C^2$ $C^2$ which extend rearwardly and are attached by any suitable bracket or fitting to the automobile frame, whereby the bumper is supported from the frame.

Although I have shown an operative device, still it will be obvious that many changes in size, shape and arrangement of parts might be made without departing materially from the spirit of my invention, and I wish therefore that my showing be taken as in a sense diagrammatic.

I claim:

1. A bumper formed of two similar elements each of them having adjacent one end a loop formed by inwardly curving its end, there being a vertical impact portion between said loops and formed in part from each of said elements, the end of each of said elements farthest from its loop being rearwardly and inwardly bent and terminating in line with and being fastened to the inner end of the loop forming portion of the other member.

2. A bumper formed of two similar elements each of them having adjacent one end a loop formed by inwardly curving its end, there being a vertically widened impact portion between said loops and formed in part from each of said elements, one of said elements being downwardly and the other upwardly displaced out of line with the horizontal plane of said loops, the ends of said displaced portions returning to the plane of the loops and being rearwardly and inwardly bent and terminating in line with and being fastened to the inner end of the loop forming portion of the other member.

3. A bumper formed of two similar spring elements each of them having adjacent one end a loop formed by inwardly curving its end, there being a vertical impact portion between said loops and formed in part from each of said elements, the end of each of said elements farthest from its loop being rearwardly and inwardly bent and terminating in line with and being fastened to the inner end of the loop forming portion of the other member.

4. A bumper formed of two similar spring elements each of them having adjacent one end a loop formed by inwardly curving its end, there being a vertically widened impact portion between said loops and formed in part from each of said elements, one of said elements being downwardly and the other upwardly displaced out of line with the horizontal plane of said loops, the ends of said displaced portions returning to the plane of the loops and being rearwardly and inwardly bent and terminating in line with and being fastened to the inner end of the loop forming portion of the other member.

5. A bumper formed of two similar flat spring elements each of them having adjacent one end a loop formed by inwardly curving its end, there being a vertical impact portion between said loops and formed in part from each of said elements, the end of each of said elements farthest from its loop being rearwardly and inwardly bent and terminating in line with and being fastened to the inner end of the loop forming portion of the other member.

6. A bumper formed of two similar flat spring elements each of them having adjacent one end a loop formed by inwardly curving its end, there being a vertically widened impact portion between said loops and formed in part from each of said elements, one of said elements being downwardly and the other upwardly displaced out of line with the horizontal plane of said loops, the ends of said displaced portions returning to the plane of the loops and being rearwardly and inwardly bent and terminating in line with and being fastened to the inner end of the loop forming portion of the other member.

7. A bumper formed of two similar elements each of them having adjacent one end a loop formed by inwardly curving its end, there being a central vertical loop between said first mentioned loops and formed in part from each of said elements, each of said elements at its end opposite to its loop being rearwardly and inwardly bent and terminating in line with and being fastened to the inner end of the loop forming portion of the other element.

8. A bumper formed of two similar elements each of them having adjacent one end a loop formed by inwardly curving its end, there being a central vertical loop between said first mentioned loops formed in part from each of said elements, one of them being downwardly and the other upwardly displaced out of line with the horizontal loops, the ends of such displaced portions returning to the plane of the loops and being rearwardly and inwardly bent and terminating in line with and being fastened to the inner end of the loop forming portion of the other element.

9. A bumper bar formed of two identically shaped members, each of said members bent to form an open horizontal loop, each of said members provided with portions extending laterally from said loop and being displaced vertically from the horizontal plane of said loop and terminating in a rearwardly and inwardly bent portion whereby there is formed between said horizontally disposed loops a vertically disposed loop joining them, and the ends of said extensions being joined to the open ends of said loops.

10. A bumper bar including two identically shaped members bent and associated together to form a pair of closed horizontally disposed spring loops joined by a single vertically disposed spring loop, each of said members provided with a short laterally extending portion, a forward bend from one end thereof, a long laterally extending portion and a short rearward bend therefrom, the short laterally extending portion of each member fastened to the short rearwardly bent portion of the other member, and said members fastened to each other intermediate their ends on their front side at points adjacent the commencement of each of said short rearward bends.

11. A bumper formed of two similar elements each of them having adjacent one end a loop formed by inwardly curving said end, there being a vertical impact portion between said loops and formed in part from each of said elements, the end of each of said elements farthest from its loop being inwardly and rearwardly bent and terminating in line with and being fastened to the loop forming portion of the other member.

12. A bumper formed of two similar elements each of them having adjacent one end a loop formed by inwardly curving its end, there being a vertically widened impact portion between said loops and formed in part from each of said elements, one of said elements being downwardly and the other upwardly displaced out of line with the horizontal plane of said loops, the ends of said displaced portions returning to the plane of the loops and being rearwardly and inwardly bent and terminating in line with and being fastened to the loop forming portion of the other member.

Signed at Chicago, county of Cook and State of Illinois, this 24th day of November, 1922.

LEWIS P. HALLADAY.